United States Patent [19]

Uchiyama et al.

[11] 3,939,079

[45] Feb. 17, 1976

[54] FILTER MEDIUM WHICH PERMITS INCREASED AMOUNT OF FILTRATION

[75] Inventors: Hiroshi Uchiyama, Hachiouji; Kazunobu Kakimoto, Funabashi; Yoshio Fujiwara, Narashino; Shigeru Yamagishi, Tokyo; Junshiro Hayakawa, Chofu, all of Japan

[73] Assignees: Mitsui Mining & Smelting Co., Ltd.; Tokyo Kokyu Rozai Co., Ltd., both of Tokyo, Japan

[22] Filed: May 15, 1973

[21] Appl. No.: 360,512

[30] Foreign Application Priority Data

May 15, 1972 Japan............................. 47-047984

[52] U.S. Cl. ................. 210/504; 210/506; 210/510
[51] Int. Cl.² ......................................... B01D 39/20
[58] Field of Search ........... 210/496, 504, 506, 510; 55/512, 523; 264/44; 106/63

[56] References Cited
UNITED STATES PATENTS 3,524,548   8/1970   McDonald et al. ................. 210/510
3,747,765   7/1973   Nowak ............................... 210/510

Primary Examiner—Thomas G. Wyse
Assistant Examiner—F. F. Calvetti
Attorney, Agent, or Firm—Sughrue, Rothwell, Mion, Zinn & Macpeak

[57] ABSTRACT

A filter medium which permits an increased amount of filtration. The filter medium can be prepared by blending 100 parts by weight of aggregate particles, 5–18 parts by weight of an inorganic bonding material having a chemical composition of about 10–50% by weight of $SiO_2$ and about 5–20% by weight of $B_2O_3$ and containing at least 70% by weight of a non-vitreous substance such as talc or boric acid, and about 3–15 parts by weight of a combustible substance such as wheat flour, kneading the mixture with a caking material and water, molding the kneaded mixture, drying it, and then calcining the dried mixture at a temperature not lower than about 1100°C. The size and number of the air-permeable pores in the filter medium can be controlled by adjusting the amounts of the bonding material and combustible substance.

6 Claims, No Drawings

FILTER MEDIUM WHICH PERMITS INCREASED AMOUNT OF FILTRATION

BACKGROUND OF THE INVENTION

1. Field of the Invention

This invention relates to a filter medium which permits an increased amount of filtration.

2. Description of the Prior Art

Conventional processes for filtering molten aluminum include a method wherein a soft medium such as a glass fiber or stainless steel screen is used, a method wherein a fixed bed of alumina is utilized, and a method wherein a rigid medium is used. The last of these methods uses an apparatus comprising a filter tank equipped with an inlet and an outlet for molten aluminum and a heating lid equipped with a heat generating element and a thermocouple, and involves passing molten aluminum from the outside to the inside of a tubular hard medium by the difference in the surface level of incoming molten aluminum and outgoing molten aluminum. This method is superior to the other methods with respect to the substantial effects of the filtration and its adaptability to field work, etc.

In general, a filter medium such as a hard filter medium should possess the following properties.

1. It should have a number of air-permeable pores or proper size and of high uniformity.
2. It should be resistant to corrosion by the material to be filtered.
3. It should have thermal resistance and spalling resistance.
4. The aggregate particles should be firmly bonded to one another and not cause filtration failure.
5. It should have mechanical strength higher than a certain level.

It has previously been known to produce a filter medium such as a hard medium using an aggregate material and a fritted vitreous binder. For example, a filter medium including a vitreous bonding material as disclosed in U.S. Pat. No. 3,524,548 has superior corrosion resistence to molten aluminum and permits stable filtration to be conducted.

However, with the vitreous bonding material used in this U.S. Patent, it is difficult to control the structure of the filter medium comprising an aggregate material, the bonding material and air-permeable pores. Accordingly, the filtration efficiency of the filter medium cannot be increased by providing a number of the air-permeable pores of a constant size.

Where the bonding material is vitreous, the following defects are encountered.

1. Since the viscosity of the bonding material gradually decreases with a rise in temperature during calcining, it is difficult to obtain increased distances between aggregate particles and to lengthen the linking bridges of the bonding material.
2. If a combustible substance is used with such a bonding material in order to increase the proportion of the air-permeable pores in the filter medium, the combustible substance carbonized within the bonding material is occluded in the vitreous substance and caused a reduction in mechanical strength and often leads to filter failure.

Accordingly, when a vitreous substance is used as the bonding material, there can be obtained only a filter medium which has a structure determined only by the nature of the aggregate particles. While the size of the pores can be controlled by varying the particle size of the aggregate, it is difficult to control the proportion of the pores in the filter medium.

Summary of the Invention

It has now been found that an inorganic bonding material having a chemical composition of about 10–50% by weight of $SiO_2$ and about 5 to about 20% by weight of $B_2O_3$ and comprising at least about 70 parts by weight, based on 100 parts by weight of the inorganic bonding material, of a non-vitreous substance such as talc, Gairome-Clay, calcined alumina or boric acid, can be used as a binder for the production of the filter medium of this invention, and that if blended with a proper amount of combustible substance such as grain powder, coke powder or an organic resin powder and aggregate particles of small sizes, such a bonding material contributes to the production of a filter medium containing a number of air-permeable pores of a constant size as a result of burning the combustible substance or the evolution of decomposition gases. The organic resin powder can sometimes also act as a caking material, depending upon the properties of the organic resin.

Further according to the present invention, there is provided a filter medium which permits an increased amount of filtration, which can be prepared by blending 100 parts by weight of aggregate particles of at least one of fused alumina, sintered alumina, silicon carbide and silicon nitride, 5–18 parts by weight of an inorganic bonding material having a chemical composition of about 10 to about 50% by weight of $SiO_2$ and about 5 to about 20% by weight of $B_2O_3$ and containing a major proportion of a non-vitreous substance, and about 3 to about 15 parts by weight of a combustible substance such as grain powder, coke powder or an organic resin powder, kneading the mixture with the necessary amounts of a caking material and water, molding the kneaded mixture, drying it, and then calcining the dried mixture at a temperature not lower than about 1100°C.

Detailed Description of the Invention

Since the major proportion of the bonding material is a non-vitreous substance, the decrease of the viscosity of the bonding material is very slight after sintering, and the linking length or distance between the bonded aggregate particles of the bonding material can be maintained sufficiently large. The structure of the filter medium can microscopically be described as aggregate particles having voids (which are formed after the combustible material is decomposed and removed) therebetween and being joined by the inorganic bonding material. The linking length is the distance between the aggregate particles. Thus, the size of the air-permeable pores can be freely controlled by blending a suitable amount of a combustible substance and selecting the size of the aggregate particles. The reduction of the mechanical strength of the filter medium caused by an increase in the number of the pores does not give rise to any practical difficulty becuase of sufficient sintering of the bonding material, and filter failure does not occur.

The term "inorganic bonding material containing a major proportion of a non-vitreous substance" denotes a bonding material containing powder(s) of a natural or artificial non-vitreous substance such as talc, Gairome-Clay, calcined alumina or boric acid. Experiments have shown that when this inorganic bonding material has a chemical composition of not more than about 50% by weight of $SiO_2$ and not less than about 5% by weight of $B_2O_3$, it has satisfactory corrosion resistance to molten aluminum when used for the production of a filter medium. The inorganic bonding material contains at least 70% by weight of a non-vitreous material, preferably 72 to 85% by weight of the non-vitreous material.

For example, a typical formulation of such a material would be:

| | | | | |
|---|---|---|---|---|
| 10 – 50% | $SiO_2$ | : | 32.8 | |
| 5 – 20% | $B_2O_3$ | : | 13.3 | |
| 20 – 60% | $Al_2O_3$ | : | 38.2 | — 98.6% |
| 2 – 10% | CaO | : | 4.5 | |
| 2 – 20% | MgO | : | 9.8 | | other materials such as $Na_2O$, $K_2O$, $Fe_2O_3$, etc. being present in trace amounts.

Preferred non-vitrous substances in accordance with the present invention consist essentially of > 10 – 50% by weight of a material of the formula: $RO_2$, i.e., a tetravalent metal oxide such as $SiO_2$, $TiO_2$, $GeO_2$ and $ZrO_2$, from 25 – 80% by weight of a material of the formula: $R_2O_3$, i.e., a trivalent metal oxide such as $Al_2O_3$, $B_2O_3$* and $Fe_2O_3$, and from 4 – 30% by weight of a material of the formula: RO, i.e., a divalent metal oxide such as CaO, MgO, ZnO, etc. Trace amounts of materials of the formula: $R_2O$, e.g., $Na_2O$, $K_2O$, etc., can be present without having a harmful effect on the non-vitreous substance.

* The 5 – 20% limitation on $B_2O_3$ in the final inorganic bonding material still applies, however.

If, on the other hand, the $SiO_2$ content of the bonding material is less than about 10% by weight and the $B_2O_3$ content more than about 20% by weight, the viscosity of the bonding material is greatly reduced even when it is calcined at a temperature of about 1100°C or higher, and it is impossible to maintain sufficient linking lengths of the bonding material.

While it is the minimum calcination temperature which is important, the maximum temperature for the calcination should generally be lower than about 2000°C, i.e., the melting point of alumina, preferably lower than 1700°C. (In the Example, calcination is conducted at 1380°C.) No special vacuum conditions or inert gas protection is necessary, and calcination is typically conducted in a hot flue gas atmosphere.

The size and number of the air-permeable pores present in the filter medium of this invention can be controlled by adjusting the amounts of the bonding material and combustible substance. It is not necessary therefore to rely only on the particle size of the aggregate in order to control the size of the pores, as is the case in producing conventional filter mediums using a vitreous bonding material. The selection of the particle size of the aggregate is relatively free, but it is suitable from about 7 to about 80 mesh (in terms of average particle size) from the view point of preventing the deformation of the filter material during calcination and obtaining substantial filtering effects on molten aluminum or the like. More preferably, the average particle size is 12 to 40 mesh, and most preferably 16 to 30 mesh, all ASTM Sieve Standard.

The particle size of the inorganic bonding material and combustible substance can vary widely as can the particle size of the aggregate. Good results are provided when the inorganic bonding material is less than 400 microns, preferably 40 to 100 microns, and the combustible substance is less than 560 microns, preferably less than 400 microns, and most preferably 50 to 300 microns.

To 100 parts by weight of the aggregate particles, 5 – 18 parts by weight of the inorganic bonding material and 3 – 15 parts by weight of the combustible substance are added. If the amount of the inorganic bonding material is much less than 5 parts by weight, the distances between the aggregate particles in the filter medium are too close, and the average diameter of the pores becomes small. This is contrary to the intended object of the present invention. On the other hand, if the amount of the inorganic bonding material is much larger than 18 parts by weight, the distances between the aggregate particles becomes too great and the linkages of the bonding material become too long, in which case high deformation of the filter material is encountered at calcination, and the resulting filter medium is useless.

If the amount of the combustible substance blended is much less than 3 parts by weight, the pores do not substantially increase in size, and if it is much above 15 parts by weight, the bonding material itself becomes too porous, which may lead to a lack of mechanical strength of the filter medium.

Calcination at temperatures of 1100°C or higher is necessary in order to completely burn the combustible substance. The term combustible substance is broad, and yet at this aspect the invention is broad. This is because the combustible substance need only be a solid material which can be "burned off" during calcination, i.e., decomposed to a gas, to leave voids in the final filter medium. So long as a material can be so decomposed, it can be freely used in the present invention. While in theory a combustible material could be used which gasifies during calcination and is later removed by a washing step, in practice such would unduly encumber the processing sequence. The combustible material, used at a suitable particle size range, is selected primarily upon cost considerations. Obvious restrictions, e.g., should not degrade or harmfully react with the other components of the filter medium, etc., will be apparent to one skilled in the art.

It is thus necessary that the chemical composition of the inorganic bonding material be selected so that a decrease in the viscosity of the bonding material does not occur at a temperature of 1100°C or greater, and also that the major proportion of the inorganic bonding material is a non-vitreous substance.

On a commercial operation scale, good results are provided when the diameter of the pores is from about 40 to about 1000 microns, more preferably 150 to 600 microns, and most preferably 250 to 400 microns. One must balance the extra care needed to control the process conditions to obtain the narrow ranges (less variation in conditions during a run is permissible) against the extra cost therefor.

The filter medium of this invention is produced by mixing an inorganic bonding material, an aggregate, a combustible substance and other materials such as water and a caking material followed by shaping and calcination. The inorganic bonding material can be prepared by mixing at least 70 parts by weight of a natural or artificial non-vitreous substance such as talc, Gairome-Clay (see the "Ceramic Dictionary", page 35, published by Maruzen Publishing Co., Ltd., Japan), calcined alumina, sintered alumina, (as is known in the art, sintered or calcined alumina is an alumina having a tablet like crystal structure prepared by sintering alumina at a temperature near its melting point.

A typical product of this type is "Tabular Alumina" manufactured by Alcoa International S.A. (99.5% $Al_2O_3$), which has a bulk density, packed lb/ft³, as a powder (minus 325 mesh) of 140, a specific gravity of 3.65 – 3.8, an apparent porosity of 5% and a water absorption of 1.5%. Fused alumina, on the other hand is alumina fused in an electrical furnace, and it is a glass-like material.), aluminum hydroxide, boric acid, calcium carbonate, magnesium carbonate, wollastonite, siliceous sand or silicate rock, and not more than about 30 parts by weight of a vitreous substance* (when the inorganic bonding material contains more than about 30% by weight of a vitreous substance, the subsequent calcination cannot effectively be carried out) such as a commercially available glaze for porcelain so as to provide a chemical composition falling within the range of about 10 to about 50% by weight of $SiO_2$ and about 5 to about 20% by weight of $B_2O_3$, and fully mixing and physically pulverizing these components in a mixer-pulverizer such as a ball mill. The particle size of the resulting inorganic bonding material is generally such as to pass a 200 mesh Tyler screen.

* Any vitreous substance can be used which resists the calcining temperature and the material being filtered, e.g., molten alumina. This is because at most about 30% of the vitreous substance is used, and with in this bound selection is free.

Then, about 5 to about 18 parts by weight of the resulting inorganic bonding material in finely divided form and about 3 to about 15 parts by weight of a combustible substance such as rice flour, wheat flour, coke powder, polystyrene powder or urea resin powder are blended with 100 parts by weight of powders of about 7 to about 80 mesh of at least one aggregate selected from the group consisting of fused alumina, sintered alumina, silicon carbide and silicon nitride, preferably having a size as heretofore defined, and the blend is kneaded with the addition of small amounts of water and a caking material such as dextrin, sulfite pulp waste liquor or polyvinyl alcohol, followed by molding and drying by any known procedure (drying is merely conducted using temperatures and periods which do not deteriorate the molded filter medium (cracking of the molded filter medium is the most serious problem). The examples serve as general guidelines where the drying was carried out at 60°C for 24 hours and then at 120°C for 24 hours. Using knowledge in the art, these figures can be freely varied.). The dried mixture is then calcined at a temperature of about 1100°C or greater.

Water and a caking material are generally used in an amount of from 1 to 10 parts by weight per 100 parts by weight of the aggregate, respectively. This is not limitative, and one skilled in the art can freely select other useful proportions.

Typically used caking material properties are disclosed in U.S. Pat. No. 3,524,548 at Column 2 lines 59–69. The caking material can be freely selected in a manner known to the art.

According to the present invention, the structure of the filter medium is positively controlled by blending the combustible substance, and therefore, a filter medium having a number of air-permeable pores can be produced with simplicity. The resulting filter medium permits an increased amount of filtration. Especially when the filter medium of this invention is used for filtering molten aluminum, the passageway for molten aluminum can be enlarged greatly, and therefore, the amount of molten aluminum filtered can be increased 30% to 100% as compared with conventional filter media for molten aluminum.

Since the size and number of the air-permeable pores of the filter medium of this invention are controlled, it is of course possible to use it for filtering other metals, gases or water in increased amounts so long as the material of the filter medium is not attacked by these materials.

Furthermore, since the filter medium of this invention has been calcined at temperatures higher than in the case of filter mediums using a vitreous bonding material, it has high thermal resistance, and since the bonding material is not a vitreous substance, the filter medium of this invention also has superior resistance to spalling.

From the heretofore offered discussion it will be clear from the use of "about" terminology to define the compositional ranges of the present invention that some leeway is permitted at the ends of the bounds. However, these bounds were determined by extensive experimentation and best results are obtained when they are strictly observed. For this reason, such "about" terminology should be interpreted with this discussion in mind.

The invention will now be further illustrated by the several Examples. The inorganic bonding materials used in the Examples were formed from individual components having the following chemical analysis values (by weight). Not all components are used in each Example, and due to analytical error the figures may not always total 100%.

|  | $Al_2O_3$ | $SiO_2$ | CaO | MgO | $B_2O_3$ | $Fe_2O_3$ | Ignition* loss |
|---|---|---|---|---|---|---|---|
| Talc | 1.30 | 59.85 | 0.86 | 28.85 | — | 3.10 | 5.21 |
| Calcium Carbonate | — | — | 54.89 | 0.93 | — | — | 43.72 |
| Gairome-Clay | 32.19 | 48.83 | 0.80 | 0.06 | — | 1.39 | 16.40 |
| Calcined alumina | 99.20 | 0.02 | — | — | — | 0.03 | — |
| Boric acid | — | — | — | — | 56.40 | — | 43.52 |
| Wollastonite | — | 51.32 | 48.01 | — | — | — | — |
| Commercially available glaze for porcelain | 8.08 | 43.45 | 3.89 | 18.74 | 25.81 | — | — |

*Merely for analytical purposes: not an important criterion of usefulness.

Example 1

23 parts by weight of talc, 23 parts by weight of calcined alumina, 20 parts by weight of Gairome-Clay, 12 parts by weight of boric acid, 7 parts by weight of calcium carbonate, and 15 parts by weight of a commercially available glaze for porcelain were mixed and pulverized for 48 hours in a ball mill to adjust the particle size of the resulting mixture such as to pass a 200 mesh Tyler screen. The resulting mixture had a chemical composition, by weight, of 32.15% of $Al_2O_3$, 30.05% of $SiO_2$, 4.78% of CaO, 9.52% of MgO, and 10.63% of $B_2O_3$. Its ignition loss was 12.27%.

9 parts by weight of the resulting mixed pulverized product and 6 parts by weight of wheat flour were blended with 100 parts by weight of commercially available fused alumina of a particle size of No. 24 (as stipulated in JIS R6001), and the blend was further kneaded with 2.5 parts by weight of dextrin and 4 parts by weight of water. The kneaded mixture was molded into a tube which was open at both ends and which had an inner diameter of 60 mm, an outer diameter of 100 mm, and a length of 900 mm, removed, and, after drying, the molded product was calcined for 8 hours at 1,350°C in a heavy oil combustion flame. The resulting product had a bulk density of 2.08, an apparent porosity of 45.0, a compression strength of 230 Kg/cm$^2$ and a grade number of 160. When molten aluminum was filtered through this tubular molded article, the amount of aluminum which could be filtered was about 1.45 times as large as that with a conventional filter medium. When this calcined product was immersed for 20 days in a bath of aluminum alloy 63S at 770°C., no change was observed.

Example 2

20 parts by weight each of calcined alumina, 20 parts by weight of Gairome-Clay, 17 parts by weight of wollastonite, 15 parts by weight of talc and 8 parts by weight of boric acid were blended with 20 parts by weight of the same glaze as was used in Example 1, and the mixture was pulverized for 48 hours in a ball mill to provide a pulverized mixture with a particle size such as to pass a 200 mesh Tyler screen. The resulting mixture had the chemical composition of 28.09% of $Al_2O_3$, 36.17% of $SiO_2$, 9.24% of CaO, 8.09% of MgO, and 9.67% of $B_2O_3$, and had an ignition loss of 7.54%.

13 parts by weight of the resulting pulverized mixture and 10 parts by weight of rice bran were blended with 100 parts by weight of commercially available fused alumina of a particle size of No. 30 (stipulated in JIS K6001), and the blend was thoroughly kneaded with 5 parts by weight of sulfite pulp waste liquor as a caking material (available from any paper mill) and 2 parts by weight of water. The kneaded mixture was molded into a tube open at both ends and having the same size as in Example 1. After drying, the molded tube was calcined for 10 hours at 1,300°C. in a heavy oil combustion flame. The product had a bulk density of 1.98, an apparent porosity of 47.7% a compression strength of 195 kg/cm$^2$ and a grade number of 180. When molten aluminum was filtered through the resulting filter medium, the amount of molten aluminum filtered was about 1.7 times as large as that with conventional filter media. When the calcined product was immersed for 20 days in a bath of aluminum alloy 63S at 770°C., no change was observed.

Example 3

100 parts by weight of fused alumina having a particle size of No. 36 (as stipulated in JIS R6001) was mixed with 16 parts of the same pulverized mixture as was obtained in Example 1 and 13.5 parts by weight of wheat flour. The mixture was thorougly kneaded with 3 parts by weight of dextrin and 6 parts by weight of water, and the mixture was molded into a tube open at both ends having the same size as in Example 1. After drying, the molded tube was calcined for 10 hours at 1,350°C. The calcined product had a bulk density of 1.89, an apparent porosity of 50.0%, a compression strength of 152 kg/cm$^2$ and a grade number of 240. The amount of molten aluminum filtered was about 1.9 times as large as that with conventional filter media.

The most important characteristics of the filter medium of this invention are as follows: it can be formed to have a grade number of about 100 to about 300, preferably 130 to 250 and most preferably 150 to 180; a bulk density of about 1.70 to about 2.27, preferably 1.80 to 2.26 and most preferably 2.00 to 2.25; and an apparent porosity of about 39.0 to about 51.0%, preferably 41.0 to 48.0% most preferably 42.0 to 46.0%.

The grade number is the number of cubic feet of air per minute that will pass through one square foot of the filter medium at a pressure of 2 inches water column.

A filter medium having the composition and characteristics as defined is superior to any current filter medium available.

While the invention has been described in detail and with reference to specific embodiments thereof, it will be apparent to one skilled in the art that various changes and modifications can be made therein without departing from the spirit and scope thereof.

What we claim is:

1. A filter medium which permits an increased amount of filtration and having a grade number of about 100 to about 300, a bulk density of about 1.70 to about 2.27 and an apparent porosity of about 39.0 to about 51.0%, said filter medium being prepared from starting materials comprising
    a. 100 parts by weight of aggregate particles of at least one of fused alumina, sintered alumina, silicon carbide and silicon nitride,
    b. 5 to 18 parts by weight of an inorganic bonding material having a chemical composition of about 10 to about 50% by weight of $SiO_2$ and about 5 to 20% by weight of $B_2O_3$, the chemical composition of said bonding material being such that a decrease in the viscosity of said bonding material does not occur at a temperature of 1100°C., or greater, at least 70% by weight of said bonding material being a non-vitreous substance selected from the group consisting of talc, Gairome-Clay, calcined alumina, sintered alumina, aluminum hydroxide, boric acid, calcium carbonate, magnesium carbonate, wollastonite, siliceous sand and siliceous stone, and
    c. 3–15 parts by weight of a combustible substance.

2. The filter medium of claim 1 wherein said combustible substance is selected from the group consisting of grain powder, coke powder, and organic resin powder.

3. The filter medium of claim 1 wherein the aggregate particles have a particles size of about 7 to about 80 mesh.

4. The filter medium of claim 1 wherein the inorganic bonding material of the filter medium comprises up to a maximum of 30% of a vitreous substance based on 100 parts by weight of the inorganic bonding material.

5. The filter medium of claim 1 wherein the non-vitreous substance comprises:
    more than 10–50% of at least one of $SiO_2$, $TiO_2$, $GeO_2$ and $ZrO_2$;
    25–80% of at least one of $Al_2O_3$, $B_2O_3$ and $Fe_2O_3$;

4–30% of at least one of CaO, MgO and ZnO; all weight percents, the total of all percents of all components being 100 weight percent.

6. The filter medium of claim 1 wherein the inorganic bonding material comprises:

10 – 50% $SiO_2$
5 – 20% $B_2O_3$
20 – 60% $Al_2O_3$
2 – 10% CaO
2 – 20% MgO, all weight percents, the total of the percents of all components being 100 weight percent.

* * * * *